(12) United States Patent
Sato et al.

(10) Patent No.: US 9,198,165 B2
(45) Date of Patent: Nov. 24, 2015

(54) SOUNDING REFERENCE SIGNAL TO DETERMINE ANTENNA WEIGHT AND FREQUENCY BANDS

(75) Inventors: Yoshizo Sato, Yawata (JP); Masaaki Nakata, Yamato (JP); Nobuaki Takamatsu, Koto (JP); Masahiro Yagi, Kawasaki (JP); Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 207 days.

(21) Appl. No.: 13/819,666

(22) PCT Filed: Aug. 26, 2011

(86) PCT No.: PCT/JP2011/069357
§ 371 (c)(1),
(2), (4) Date: Mar. 28, 2013

(87) PCT Pub. No.: WO2012/026603
PCT Pub. Date: Mar. 1, 2012

(65) Prior Publication Data
US 2013/0215851 A1 Aug. 22, 2013

(30) Foreign Application Priority Data

Aug. 27, 2010 (JP) .................................. 2010-191351
Aug. 27, 2010 (JP) .................................. 2010-191352

(51) Int. Cl.
*H04W 72/04* (2009.01)
*H04L 5/00* (2006.01)

(52) U.S. Cl.
CPC ......... *H04W 72/0406* (2013.01); *H04L 5/0007* (2013.01); *H04L 5/0051* (2013.01); *H04L 5/0094* (2013.01); *H04L 5/0096* (2013.01)

(58) Field of Classification Search
CPC ...................................................... H04W 72/04
USPC ............................................................ 370/329
See application file for complete search history.

(56) References Cited

U.S. PATENT DOCUMENTS 7,421,012 B1 * 9/2008 Feng et al. ..................... 375/148
8,737,335 B2 * 5/2014 Konishi et al. ................ 370/329
(Continued)

FOREIGN PATENT DOCUMENTS

JP  2008-211686 A   9/2008
JP  2009-060596 A   3/2009
(Continued)

OTHER PUBLICATIONS

An Office Action; "Notice of Reasons for Rejection," issued by the Japanese Patent Office on Oct. 29, 2013, which corresponds to Japanese Patent Application No. 2012-530749 and is related to U.S. Appl. No. 13/819,666; with English statement of relevance.
International Search Report; PCT/JP2011/069357; Sep. 27, 2011.
3GPP TS 36.211 8.7.0 (May 2009); 3rd Generation Partnership Project; Technical Specification Group Radio Access Network; Evolved Universal Terrestrial Radio Access (E-UTRA); Physical Channels and Modulation (Release 8).

*Primary Examiner* — Hassan Kizou
*Assistant Examiner* — Deepa Belur
(74) *Attorney, Agent, or Firm* — Studebaker & Brackett PC

(57) ABSTRACT

A wireless base station (eNB1-1) uses in a differentiated manner, depending on the expected data amount of downlink transmission to the serving wireless terminal UE, the transmission of RRC Connection Reconfiguration messages in which SRS specific transmission request information is set, and the transmission of RRC Connection Reconfiguration messages in which SRS hopping transmission request information is set.

7 Claims, 9 Drawing Sheets

(56) References Cited

U.S. PATENT DOCUMENTS

| | | | |
|---|---|---|---|
| 2006/0292994 A1* | 12/2006 | Oura et al. | 455/67.16 |
| 2008/0037464 A1* | 2/2008 | Lim et al. | 370/329 |
| 2008/0081671 A1* | 4/2008 | Wang et al. | 455/562.1 |
| 2009/0042615 A1 | 2/2009 | Teo et al. | |
| 2009/0042616 A1 | 2/2009 | Teo et al. | |
| 2009/0181687 A1* | 7/2009 | Tiirola et al. | 455/450 |
| 2009/0270060 A1* | 10/2009 | Hoo et al. | 455/277.1 |
| 2010/0157909 A1* | 6/2010 | Miura et al. | 370/329 |
| 2010/0215114 A1* | 8/2010 | Kim et al. | 375/267 |
| 2010/0246638 A1* | 9/2010 | Mehta et al. | 375/133 |

FOREIGN PATENT DOCUMENTS

| | | |
|---|---|---|
| JP | 2010-177955 A | 8/2010 |
| JP | 2011-518448 A | 6/2011 |
| WO | 2009/136658 A2 | 11/2009 |

* cited by examiner

FIG. 3
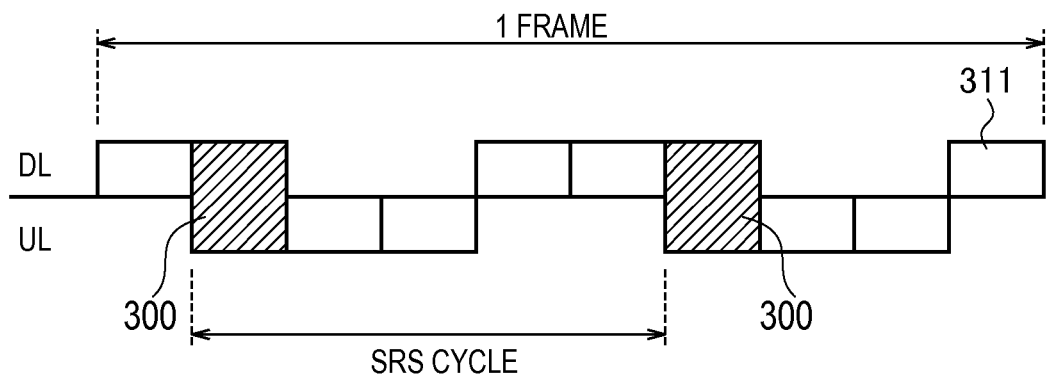
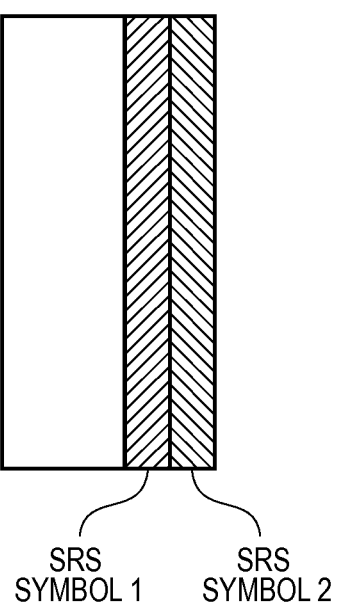

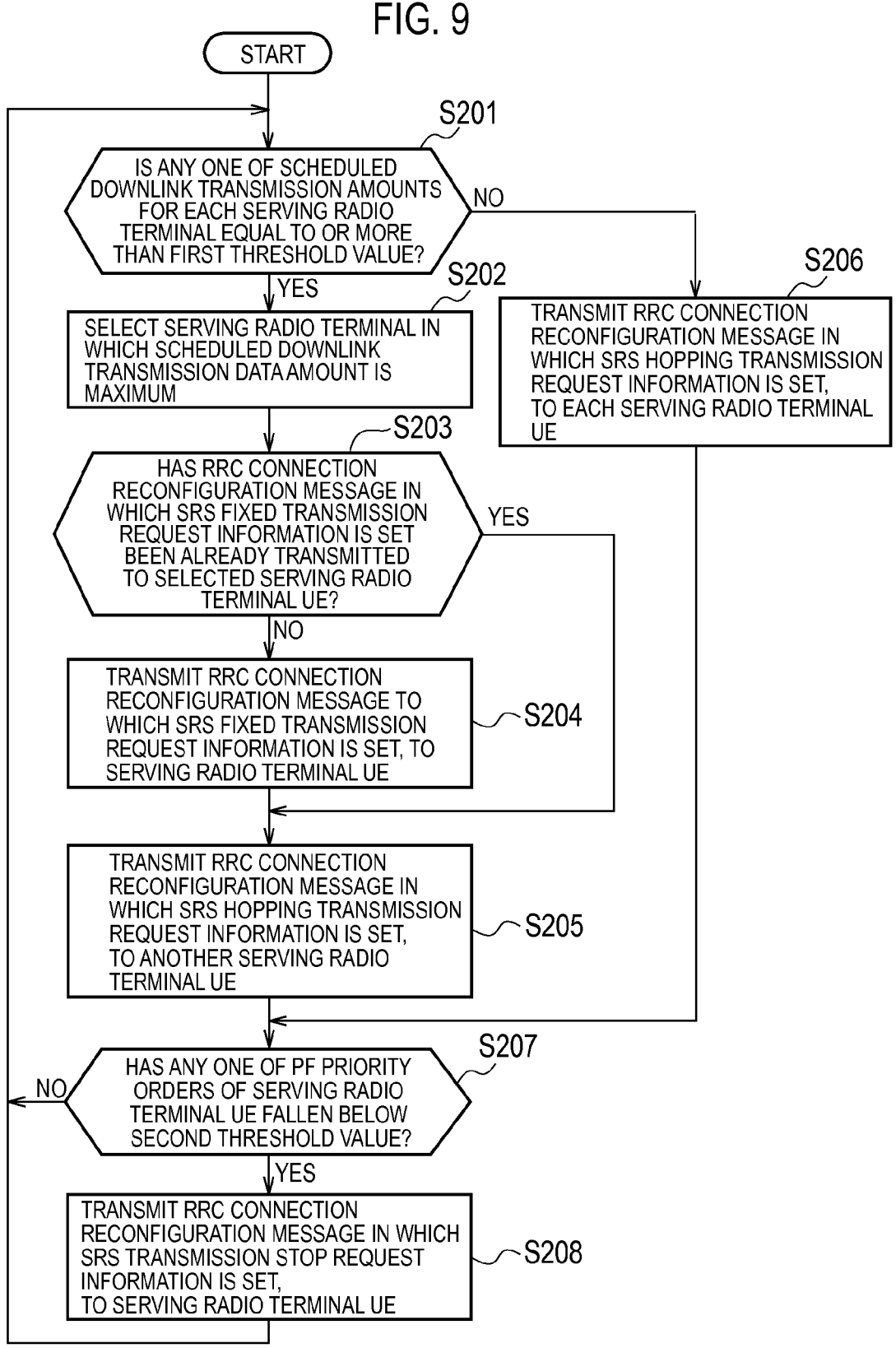

SOUNDING REFERENCE SIGNAL TO DETERMINE ANTENNA WEIGHT AND FREQUENCY BANDS

TECHNICAL FIELD

The present invention relates to a radio base station of an adaptive array scheme applying an antenna weight to a plurality of antennas, and a communication control method in such a radio base station.

BACKGROUND ART

In 3GPP (Third Generation Partnership Project), in a radio communication system corresponding to LTE (Long term Evolution), for which the standards are being set up currently, a radio base station eNB assigns a radio resource in the radio communication between the radio base station eNB and a radio terminal UE (for example, see Non Patent Literature 1). Furthermore, in a radio communication system corresponding to LTE, either one of Frequency Division Duplex (FDD) or Time Division Duplex (TDD) is employed in the radio communication between the radio base station eNB and the radio terminal UE.

Moreover, in an LTE (TDD-LTE) radio communication system employing the TDD, there has been discussed a feature where a radio base station eNB performs control for adaptively directing a beam (adaptive array control) toward the radio terminal UE at the time of transmission of a downlink radio signal, in order to ensure communication quality between the radio base station eNB and a radio terminal UE that is moving.

According to a technique of calculating the antenna weight, when a radio base station eNB receives a sounding reference signal (SRS), which is an uplink radio signal from a radio terminal UE, it is considered that the radio base station eNB calculates an antenna weight for a downlink resource block that has a frequency band equal to a frequency band of the SRS.

In such a case, if the downlink resource block assigned to the radio terminal UE switches frequently, the transmission frequency band of the SRS also needs to be switched in accordance with the switching of the downlink resource block so that the above antenna weight is calculated appropriately. Therefore, a control message for the transmission frequency band of the SRS is transmitted frequently from the radio base station eNB to the radio terminal UE because of which the utilization efficiency of the radio resource declines. Moreover, when the radio base station eNB efficiently assigns a radio resource to a plurality of radio terminals UE, it becomes necessary to be able to perform control in an easy manner.

In view of the above problem, a first object of the present invention is to provide a radio base station and a communication control method, by which the utilization efficiency of a radio resource is improved. Furthermore, a second object of the present invention is to provide a radio base station and a communication control method by which it is possible to assign a radio resource in an easy manner while improving the utilization efficiency of the radio resource.

CITATION LIST

Non Patent Literature

[Non Patent Literature 1] 3GPP TS 36.211 V8.7.0 "Physical Channels and Modulation", May 2009

SUMMARY OF INVENTION

To achieve the first object described above, the present invention has following features. A first feature of the present invention is summarized as a radio base station (radio base station eNB 1-1) of an adaptive array radio scheme applying an antenna weight to a plurality of antennas (antenna 108A, antenna 108B, antenna 108C, antenna 108D), comprising: a transmission unit (control unit 102, radio communication unit 106, modulation and demodulation unit 107, antenna 108A, antenna 108B, antenna 108C, antenna 108D) that transmits, to a serving radio terminal, information on a reference signal transmission frequency band available in a transmission of a reference signal from the serving radio terminal, the reference signal being referenced in a calculation of the antenna weight, wherein the transmission unit transmits at least either one of information on a first reference signal transmission frequency band indicating a fixed frequency band (SRS fixed transmission request information), or information on a second reference signal transmission frequency band indicating a frequency band that switches in a predetermined cycle (SRS hopping transmission request information).

The radio base station described above can reduce the number of transmission requests of a reference signal by selectively using between a transmission request of a reference signal in a first reference signal transmission frequency band indicating a fixed frequency band, and a transmission request of a reference signal in a second reference signal transmission frequency band indicating a frequency band that switches in a predetermined cycle, and can thus use a radio resource efficiently.

A second feature of the present invention is summarized as that the first reference signal transmission frequency band is wider than the second reference signal transmission frequency band, and the transmission unit transmits the information on the first reference signal transmission frequency band, when the downlink data amount that must be transmitted to the serving radio terminal is equal to or more than a first threshold value, and the transmission unit transmits the information on the second reference signal transmission frequency band, when the downlink data amount that must be transmitted to the serving radio terminal is less than the first threshold value.

A third feature of the present invention is summarized as that the transmission unit transmits transmission stop request information requesting to stop transmission of the reference signal, to the serving radio terminal, when a communication quality in the serving radio terminal is below a second threshold value.

A forth feature of the present invention is summarized as a communication control method in a radio base station of an adaptive array scheme applying an antenna weight to a plurality of antennas, comprising: a step of transmitting, to a serving radio terminal, information on a reference signal transmission frequency band available in a transmission of a reference signal from the serving radio terminal, the reference signal referenced in a calculation of the antenna weight, wherein the step of transmitting includes a step of transmitting at least either one of information on a first reference signal transmission frequency band indicating a fixed frequency band, or information on a second reference signal transmission frequency band indicating a frequency band that switches in a predetermined cycle.

To achieve the second object described above, the present invention has following features. A fifth feature of the present invention is summarized as a radio base station (radio base station eNB1-1) of an adaptive array radio scheme applying an antenna weight to a plurality of antennas (antenna 108A, antenna 108B, antenna 108C, antenna 108D), comprising: a transmission unit (control unit 102, radio communication unit 106, modulation and demodulation unit 107, antenna 108A, antenna 108B, antenna 108C, antenna 108D) that transmits, to a serving radio terminal, information on a reference signal transmission frequency band available in a transmission of a reference signal from the serving radio terminal, the reference signal referenced in a calculation of the antenna weight, wherein the transmission unit transmits at least any one of information on a first reference signal transmission frequency band indicating a fixed frequency band and a first symbol position (SRS symbol 1) indicating a transmission timing when the reference signal is transmitted using the first reference signal transmission frequency band (SRS fixed transmission request information), or information on a second reference signal transmission frequency band indicating a frequency band that switches in a predetermined cycle and a second symbol position (SRS symbol 2) indicating a transmission timing when the reference signal is transmitted using the second reference signal transmission frequency band (SRS hopping transmission request information), and the first symbol position is correlated with the timing of a first radio resource, and the second symbol position is correlated with the timing of a second radio resource.

The radio base station described above can reduce the number of transmission requests of a reference signal by selectively using between a transmission request of a reference signal in a first reference signal transmission frequency band indicating a fixed frequency band, and a transmission request of a reference signal in a second reference signal transmission frequency band indicating a frequency band that switches in a predetermined cycle, and can thus use a radio resource efficiently. Moreover, because a symbol position of a reference signal and a timing of an assigned radio resource are correlated, the radio base station can easily assign, to a different serving radio terminal, radio resources having overlapping frequency bands but different timing.

A sixth feature of the present invention is summarized as that the first reference signal transmission frequency band is wider than the second reference signal transmission frequency band, and the transmission unit transmits the information on the first reference signal transmission frequency band and the information on the first symbol position, when the downlink data amount that must be transmitted to the serving radio terminal is equal to or more than a first threshold value, and the transmission unit transmits the information on the second reference signal transmission frequency band and the information on the second symbol position, when the downlink data amount that must be transmitted to the serving radio terminal is less than the first threshold value.

A seventh feature of the present invention is summarized as that the transmission unit transmits transmission stop request information requesting to stop transmission of the reference signal, to the serving radio terminal, when a communication quality in the serving radio terminal is below a second threshold value.

An eight feature of the present invention is summarized as a communication control method in a radio base station of an adaptive array scheme applying an antenna weight to a plurality of antennas, comprising: a step of transmitting, to a serving radio terminal, information on a reference signal transmission frequency band available in a transmission of a reference signal from the serving radio terminal, the reference signal referenced in a calculation of the antenna weight, wherein the step of transmitting includes a step of transmitting at least any one of information on a first reference signal transmission frequency band indicating a fixed frequency band and a first symbol position indicating a transmission timing when the reference signal is transmitted using the first reference signal transmission frequency band, or information on a second reference signal transmission frequency band indicating a frequency band that switches in a predetermined cycle and a second symbol position indicating a transmission timing when the reference signal is transmitted using the second reference signal transmission frequency band, and the first symbol position is correlated with the timing of a first radio resource, and the second symbol position is correlated with the timing of a second radio resource.

BRIEF DESCRIPTION OF DRAWINGS

FIG. 3 is a diagram illustrating a format of a frame according to the embodiment of the present invention.

FIG. 9 is a flowchart illustrating a second operation of the radio base station according to the embodiment of the present invention.

DESCRIPTION OF EMBODIMENTS

Figure 1:
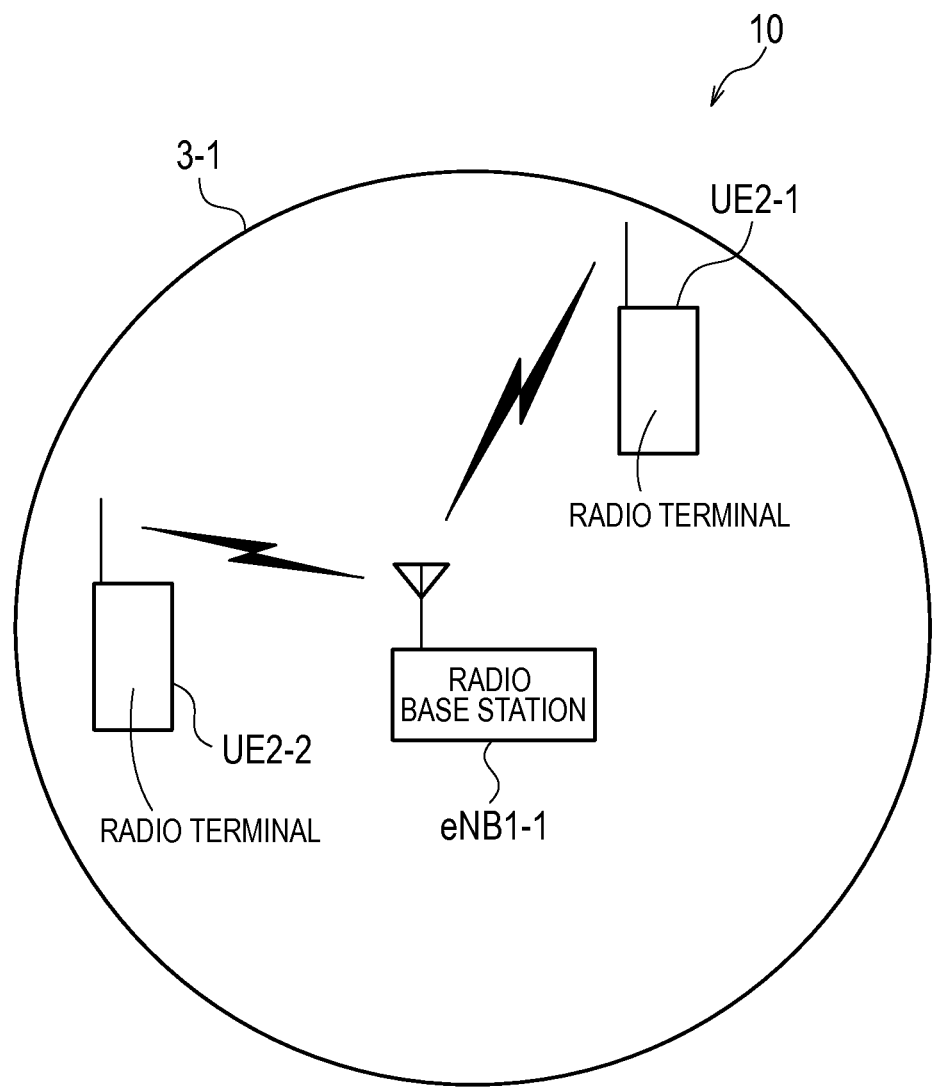
FIG. 1 is a diagram showing the entire schematic configuration of a radio communication system according to an embodiment of the present invention.

Next, an embodiment of the present invention will be described with reference to the drawings. Specifically, (1) Configuration of radio communication system, (2) Configuration of radio base station, (3) Operation of radio base station, (4) Operation and effect, and (5) Other embodiments will be described. It is to be noted that the same or similar reference numerals are applied to the same or similar parts through the drawings in the following embodiments.

(1) Configuration of Radio Communication System

FIG. 1 is a diagram illustrating the entire schematic configuration of a radio communication system 10 according to the embodiment of the present invention.

The radio communication system 10 illustrated in FIG. 1 is a TDD-LTE radio communication system. The radio communication system 10 includes a radio base station eNB1-1, a radio terminal UE2-1 and a radio terminal UE2-2.

The radio terminal UE2-1 and the radio terminal UE2-2 are terminals to which a resource block is assigned by the radio base station eNB1-1. In this case, when the radio base station eNB1-1 is set as a reference, the radio terminal UE2-1 and the radio terminal UE2-2 are serving radio terminals. Hereinafter, the radio terminals, to which the resource block is assigned by the radio base station eNB1-1, will be appropriately referred to as the serving radio terminal UE2-1 and the serving radio terminal UE2-2.

While Time Division Duplex is employed in the radio communication between the radio base station eNB1-1 and the radio terminal UE2-1 and radio terminal UE2-2, OFDMA (Orthogonal Frequency Division Multiplexing Access) is employed in the downlink radio communication, and SC-FDMA (Single Carrier Frequency Division Multiple Access) is employed in the uplink radio communication. Furthermore, downlink indicates a direction from the radio base station eNB1-1 to the radio terminal UE2-1 and the radio terminal UE2-2. Uplink indicates a direction from the radio terminal UE2-1 and the radio terminal UE2-2 to the radio base station eNB1-1.

The radio base station eNB1-1 assigns a resource block (RB) as a radio resource to the serving radio terminal UE2-1 and the serving radio terminal UE2-2 in a cell 3-1.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 2:
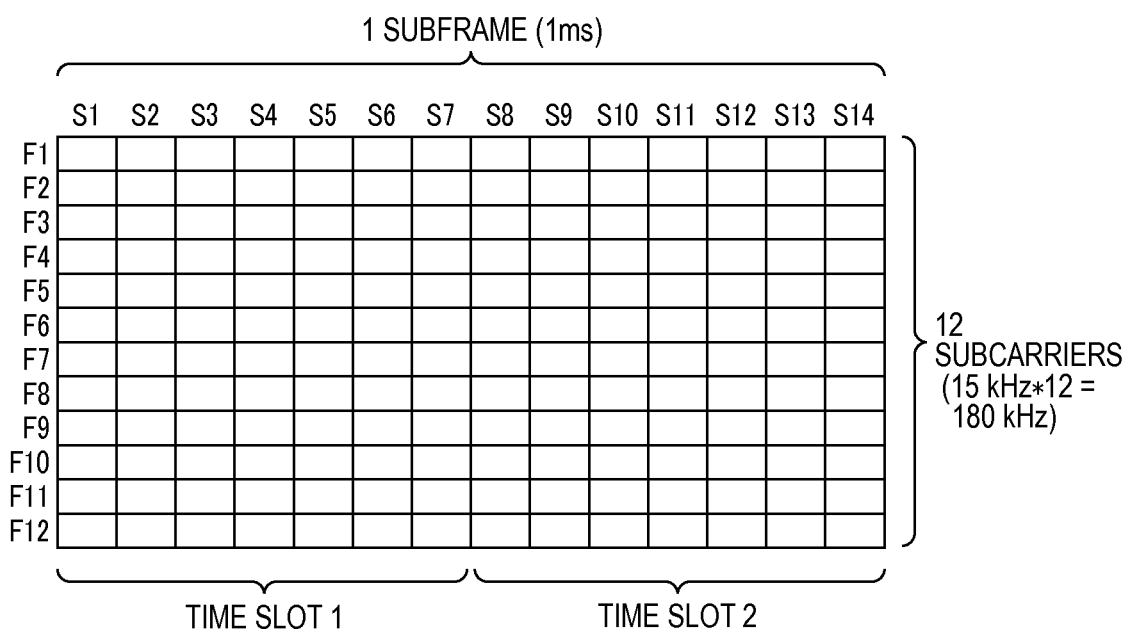
FIG. 2 is a diagram illustrating a format of a resource block according to the embodiment of the present invention.

FIG. 2 is a diagram illustrating a format of the resource block. The resource block is configured in one subframe having a time length of 1 [ms] in the time direction. The subframe includes a time period S1 to a time period S14. Among the time period S1 to the time period S14, the symbol S1 to the symbol S7 constitute a first half time slot (a time slot 1) and the symbol S8 to the symbol S14 constitute a latter half time slot (a time slot 2). Also, the time slot 1 and the time slot 2 correspond to the resource block.

As illustrated in FIG. 2, the resource block has a frequency width of 180 [kHz] in the frequency direction. Furthermore, the resource block includes 12 subcarriers F1 to F12 having a frequency width of 15 [kHz].

Furthermore, in the time direction, a plurality of subframes constitute one frame. FIG. 3 is a diagram illustrating a format of the frame. The frame illustrated in FIG. 3(*a*) includes 10 subframes. The frame includes 10 subframes in the sequence of a subframe of a downlink resource block, subframes (special subframes: SSF) 300 of both the downlink resource block and an uplink resource block, a subframe of the uplink resource block, a subframe of the uplink resource block, a subframe of the downlink resource block, a subframe of the downlink resource block, a special subframe 300, a subframe of the uplink resource block, a subframe of the uplink resource block, and a subframe 311 of the downlink resource block.

In the special subframes, within the subframe, the first half time slot is used for downlink radio communication and the latter half time slot is used for uplink radio communication across a guard time. Also, as illustrated in FIG. 3(*b*), the special subframe includes an SRS symbol 1 and an SRS symbol 2 corresponding to a transmission time period of SRS, at the end.

Furthermore, in the frequency direction, the entire frequency band of the radio resource available in the radio communication between the radio base station eNB1-1 and the serving radio terminal UE2-1 and serving radio terminal UE2-2, in other words, the frequency band that can be assigned to the serving radio terminal UE2-1 and the serving radio terminal UE2-2 (assigned frequency band), has a bandwidth corresponding to the number of a plurality of resource blocks.

Figure 4:
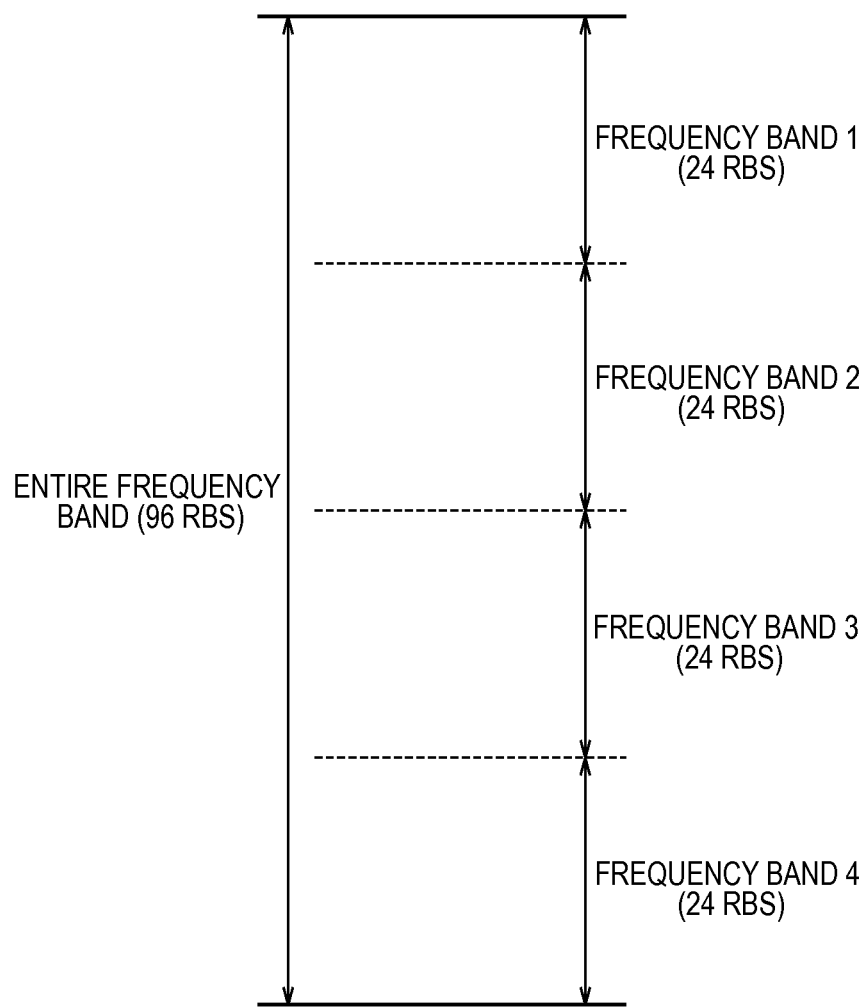
FIG. 4 is a diagram illustrating a configuration of a frequency band of a radio resource available in radio communication between a radio base station and a radio terminal according to the embodiment of the present invention.

FIG. 4 is a diagram illustrating a configuration of the entire frequency band available in the radio communication between the radio base station eNB1-1 and the serving radio terminal UE2-1 and serving radio terminal UE2-2. As illustrated in FIG. 4, the entire frequency band available in the radio communication between the radio base station eNB1-1 and the serving radio terminal UE2-1 and serving radio terminal UE2-2 has a bandwidth corresponding to 96 resource blocks. Furthermore, the entire frequency band is divided into a frequency band 1 to a frequency band 4, each of which has a bandwidth corresponding to 24 resource blocks.

The downlink resource block is configured by a control information channel (PDCCH: Physical Downlink Control CHannel) for downlink control information transmission and a shared data channel (PDSCH: Physical Downlink Shared CHannel) for downlink user data transmission, in the time direction.

On the other hand, in the uplink resource block, a control information channel (PUCCH: Physical Uplink Control CHannel) for uplink control information transmission is configured at both ends of the entire frequency band available in the uplink radio communication, and a shared data channel (PUSCH: Physical Uplink Shared CHannel) for uplink user data transmission is configured in the central part.

(2) Configuration of Radio Base Station

Figure 5:
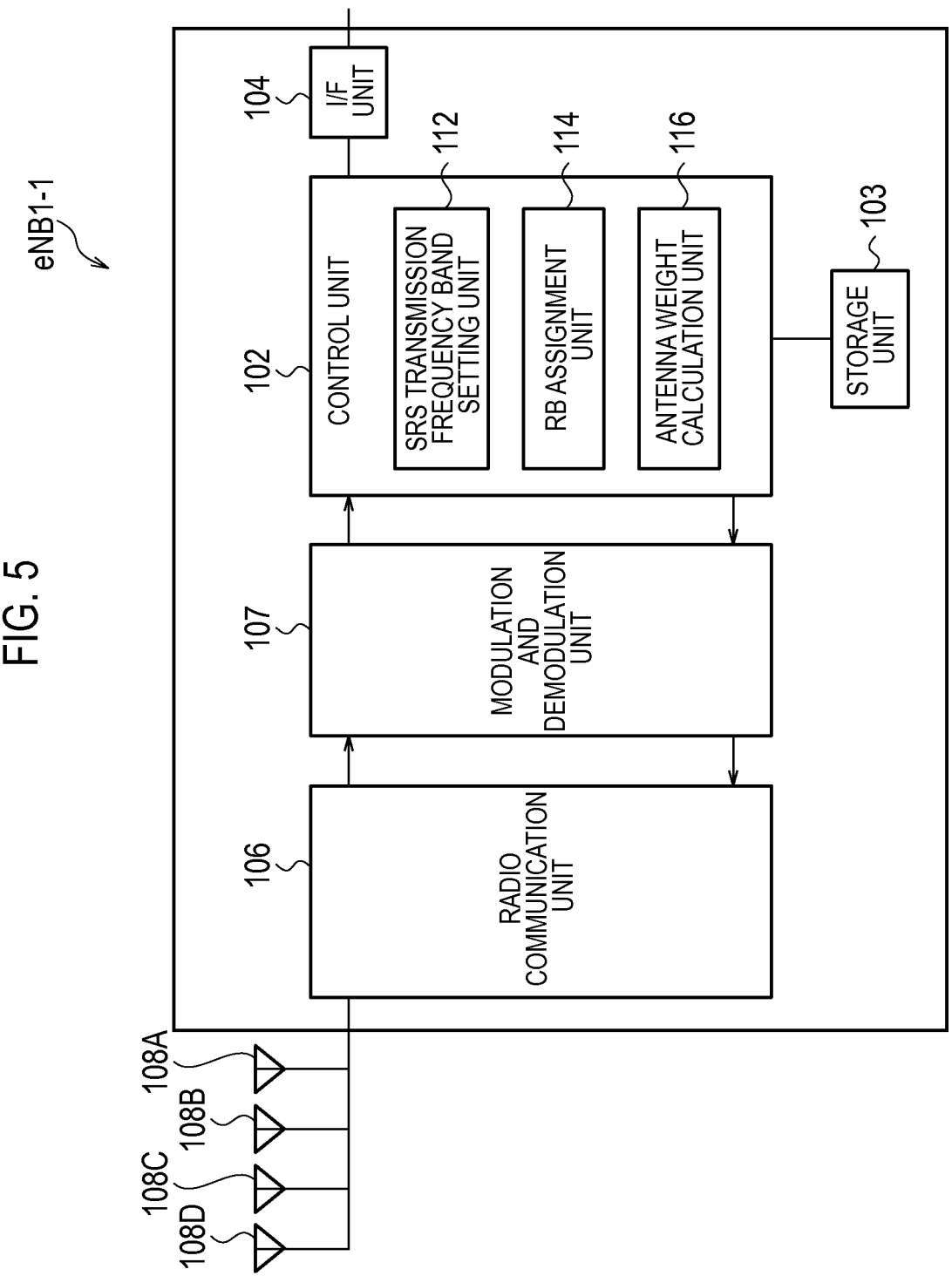
FIG. 5 is a configuration diagram of a radio base station according to the embodiment of the present invention.

FIG. 5 is a configuration diagram of the radio base station eNB1-1. As illustrated in FIG. 5, the radio base station eNB1-1 is a radio base station of an adaptive array scheme applying an antenna weight to a plurality of antennas, and includes a control unit 102, a storage unit 103, an I/F unit 104, a radio communication unit 106, a modulation and demodulation unit 107, an antenna 108A, an antenna 108B, an antenna 108C, and an antenna 108D.

The control unit 102, for example, is configured by a CPU, and controls various functions of the radio base station eNB1-1. The control unit 102 includes a sounding reference signal (SRS) transmission frequency band setting unit 112, a resource block (RB) assignment unit 114, and an antenna weight calculation unit 116. The storage unit 103, for example, is configured by a memory, and stores various types of information used for the control and the like of the radio base station eNB1-1.

The I/F unit 104 is able to communicate with another radio base station eNB through an X2 interface. Furthermore, the I/F unit 104 is able to communicate with EPC (Evolved Packet Core) that is not illustrated in the diagram, more specifically, with MME (Mobility Management Entity)/S-GW (Serving Gateway) through an S1 interface.

The radio communication unit 106 receives an uplink radio signal, which is transmitted from the serving radio terminal UE2-1 and the serving radio terminal UE2-2, through the antenna 108A to the antenna 108D. Moreover, the radio communication unit 106 converts (down-converts) the received uplink radio signal to a baseband signal, and outputs the baseband signal to the modulation and demodulation unit 107.

The modulation and demodulation unit 107 performs demodulation and decoding processes for the input baseband signal. In this way, the data included in the uplink radio signal transmitted from the serving radio terminal UE2-1 and the serving radio terminal UE2-2 is obtained. The data is output to the control unit 102.

Furthermore, the modulation and demodulation unit 107 performs encoding and modulation of data from the control unit 102, thereby obtaining a baseband signal. The radio communication unit 106 converts (up-converts) the baseband signal to a downlink radio signal. Moreover, the radio communication unit 106 transmits the downlink radio signal through the antenna 108A to the antenna 108D.

The SRS transmission frequency band setting unit 112 of the control unit 102 sets, to the serving radio terminal UE2-1 and the serving radio terminal UE2-2, a frequency band (SRS transmission frequency band) that is used when the serving radio terminal UE2-1 and the serving radio terminal UE2-2 transmit a sounding reference signal (SRS) at a timing of a special subframe. Furthermore, the SRS is a signal to be referred to in the calculation of an antenna weight in the radio base station eNB1-1, and is an uplink radio signal of a radio frequency band.

In the present embodiment, the SRS transmission frequency band is switched in the sequence of the frequency band 1, the frequency band 3, the frequency band 2, and the frequency band 4 illustrated in FIG. 4, and then returns to the frequency band 1, in a so-called periodical switching sequence. In such a case, the serving radio terminal UE2-1 and the serving radio terminal UE2-2 perform the process of transmitting the SRS while switching in the sequence of the frequency band 1, the frequency band 3, the frequency band 2, and the frequency band 4 (SRS hopping transmission). Alternatively, the entire frequency band illustrated in FIG. 4 is set in a fixed manner as the SRS transmission frequency band. In such a case, the serving radio terminal UE2-1 and the serving radio terminal UE2-2 perform the process of transmitting the SRS using the entire fixed frequency band (SRS fixed transmission).

When the SRS transmission frequency band setting unit 112 sets the SRS transmission frequency band for the serving radio terminal UE2-1 to transmit the SRS at the timing of a special subframe in a predetermined frame, the SRS transmission frequency band setting unit 112 transmits the information on the set SRS transmission frequency band to the serving radio terminal UE2-1 and the serving radio terminal UE2-2, at the timing of the subframe (the subframe 311 of FIG. 3) of the last downlink resource block of the frame that is two frames before the predetermined frame.

Specifically, the SRS transmission frequency band setting unit 112 performs: either one of the following first process or second process; and the second process.

(First Process)

The first process is performed when an SRS transmission frequency band is set for one serving radio terminal UE (which is the serving radio terminal UE2-1 in this case). A prerequisite of the first process is that based on a PF (Proportional Fair) scheme, a priority order of assignment of a downlink resource block to the serving radio terminal UE2-1 is either one of the same priority order as a priority order indicated by a predetermined secondary threshold value, or a priority order that is higher than the priority order indicated by the second threshold value.

The SRS transmission frequency band setting unit 112 determines if an amount of data to be scheduled for downlink transmission (scheduled downlink transmission data amount) to the serving radio terminal UE2-1 is equal to or more than a predetermined first threshold value.

If the scheduled downlink transmission data amount is equal to or more than the first threshold value, the SRS transmission frequency band setting unit 112 performs the process of requesting transmission of SRS using the entire fixed frequency band illustrated in FIG. 4, at the timing of the SRS symbol 1 illustrated in FIG. 3(*b*). Specifically, the SRS transmission frequency band setting unit 112 sets a parameter corresponding to the bandwidth of the entire fixed frequency band, in SoundingRS-UL-Config, that is, the information element an RRC Connection Reconfiguration message. Furthermore, the SRS transmission frequency band setting unit 112 sets the information on a center frequency of the entire fixed frequency band, and the information on the SRS symbol 1, in the RRC Connection Reconfiguration message.

In addition, the SRS transmission frequency band setting unit 112 outputs to the modulation and demodulation unit 107, the RRC Connection Reconfiguration message in which the parameter as well as the information on the center frequency of the entire fixed frequency band, and the information on the SRS symbol 1 (hereinafter, these are appropriately referred to as "SRS fixed transmission request information") is set, at the timing of the subframe 311 of the downlink resource block illustrated in FIG. 3(*a*).

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal to the serving radio terminal UE2-1, through the antenna 108A to the antenna 108D.

However, if a downlink radio signal corresponding to the RRC Connection Reconfiguration message in which the SRS fixed transmission request information is set is already transmitted, the SRS transmission frequency band setting unit 112 does not set the SRS fixed transmission request information in the RRC connection Reconfiguration message, and also does not output the RRC Connection Reconfiguration message. Therefore, the transmission of the downlink radio signal corresponding to the RRC Connection Reconfiguration message in which the SRS fixed transmission request information is set is also not performed.

The case when a downlink radio signal corresponding to the RRC Connection Reconfiguration message in which the SRS fixed transmission request information is set is already transmitted implies the state when after the transmission of the downlink radio signal corresponding to the RRC Connection Reconfiguration message in which the SRS fixed transmission request information is set, an RRC Connection Reconfiguration message in which the SRS hopping transmission request information described later is set, and an RRC Connection Reconfiguration message in which the SRS transmission stop request information is set, are not transmitted to the serving radio terminal UE2-1.

On the other hand, if the scheduled downlink transmission data amount is less than the first threshold value, the SRS transmission frequency band setting unit 112 performs the process of requesting transmission of SRS using any one of the frequency band 1 through the frequency band 4 illustrated in FIG. 4, at the timing of the SRS symbol 2 illustrated in FIG. 3(*b*). Specifically, the SRS transmission frequency band setting unit 112 sets a parameter corresponding to the bandwidth of any one of the frequency band 1 through the frequency band 4, in SoundingRS-UL-Config, that is, the information element of an RRC Connection Reconfiguration message. Furthermore, the SRS transmission frequency band setting unit 112 sets the information on a center frequency of any one of the frequency band 1 through the frequency band 4, and the information on the SRS symbol 2, in the RRC Connection Reconfiguration message.

In addition, the SRS transmission frequency band setting unit 112 outputs to the modulation and demodulation unit 107, an RRC Connection Reconfiguration message in which the parameter as well as the information on the center frequency of any one of the frequency band 1 through the frequency band 4, and the information on the SRS symbol 2 (hereinafter, these are appropriately referred to as "SRS hopping transmission request information") is set, at the timing of the subframe 311 of the downlink resource block illustrated in FIG. 3(*a*).

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal to the serving radio terminal UE2-1, through the antenna 108A to the antenna 108D.

(Second Process)

The second process is performed when an SRS transmission frequency band is set for the serving radio terminal UE2-1 and the serving radio terminal UE2-2. A prerequisite of the second process is that based on the PF scheme, a priority order of assignment of a downlink resource block to the serving radio terminal UE2-1 and the serving radio terminal UE2-2 is either one of the same priority order as a priority order indicated by a predetermined secondary threshold value, or a priority order that is higher than the priority order indicated at the second threshold.

The SRS transmission frequency band setting unit 112 determines if either one of the scheduled downlink transmission data amounts to the serving radio terminal UE2-1 or the scheduled downlink transmission data amount to the serving radio terminal UE2-2 is equal to or more than a predetermined first threshold value.

If either one of the scheduled downlink transmission data amount to the serving radio terminal UE2-1 or the scheduled downlink transmission data amount to the serving radio terminal UE2-2 is equal to or more than the first threshold value, the SRS transmission frequency band setting unit 112 selects the serving radio terminal UE in which the corresponding scheduled transmission data amount is maximum, from the serving radio terminal UE2-1 and the serving radio terminal UE2-2.

The SRS transmission frequency band setting unit 112 performs the process of requesting, to the selected serving radio terminal, the transmission of SRS using the entire fixed frequency band illustrated in FIG. 4, at the timing of the SRS symbol 1 illustrated in FIG. 3(*b*). Specifically, same as the first process, the SRS transmission frequency band setting unit 112 sets a parameter corresponding to the bandwidth of the entire fixed frequency band, in SoundingRS-UL-Config, that is, the information element of an RRC Connection Reconfiguration message. Furthermore, the SRS transmission frequency band setting unit 112 sets the information on a center frequency of the entire fixed frequency band, and the information on the SRS symbol 1, in the RRC Connection Reconfiguration message.

In addition, the SRS transmission frequency band setting unit 112 outputs to the modulation and demodulation unit 107, the RRC Connection Reconfiguration message in which the parameter as well as the information on the center frequency of the entire fixed frequency band, and the information on the SRS symbol 1 (SRS fixed transmission request information) is set, at the timing of the subframe 311 of the downlink resource block illustrated in FIG. 3(*a*).

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal to the selected serving radio terminal UE, through the antenna 108A to the antenna 108D.

However, if a downlink radio signal corresponding to the RRC Connection Reconfiguration message in which the SRS fixed transmission request information is set is already transmitted to the selected serving radio terminal UE, the SRS transmission frequency band setting unit 112 does not set the SRS fixed transmission request information in the RRC connection Reconfiguration message, and also does not output the RRC Connection Reconfiguration message. Therefore, the transmission of the downlink radio signal corresponding to the RRC Connection Reconfiguration message in which the SRS fixed transmission request information is set is also not performed.

The case when a downlink radio signal corresponding to the RRC Connection Reconfiguration message in which the SRS fixed transmission request information is set is already transmitted to the selected serving radio terminal UE implies the state when after the transmission of the downlink radio signal corresponding to the RRC Connection Reconfiguration message in which the SRS fixed transmission request information is set, an RRC Connection Reconfiguration message in which the SRS hopping transmission request information is set, and an RRC Connection Reconfiguration message in which the SRS transmission stop request information is set, are not transmitted to the selected serving radio terminal UE.

On the other hand, the SRS transmission frequency band setting unit 112 performs, on the other serving radio terminal UE that is not selected, the process of requesting transmission of SRS using any one of the frequency band 1 through the frequency band 4 illustrated in FIG. 4, at the timing of the SRS symbol 2 illustrated in FIG. 3(*b*). Specifically, the SRS transmission frequency band setting unit 112 sets a parameter corresponding to the bandwidth of any one of the frequency band 1 through the frequency band 4, in SoundingRS-UL-Config, that is, the information element of an RRC Connection Reconfiguration message. Furthermore, the SRS transmission frequency band setting unit 112 sets the information on a center frequency of any one of the frequency band 1 through the frequency band 4, and the information on the SRS symbol 2, in the RRC Connection Reconfiguration message. If there are a plurality of other serving radio terminals that are not selected, the SRS transmission frequency band setting unit 112 sets a parameter such that the other serving radio terminals transmit SRS using different frequency bands.

In addition, the SRS transmission frequency band setting unit 112 outputs to the modulation and demodulation unit 107, the RRC Connection Reconfiguration message in which the parameter as well as the information on the center frequency of any one of the frequency band 1 through the frequency band 4, and the information on the SRS symbol 2 (SRS hopping transmission request information) is set, at the timing of the subframe 311 of the downlink resource block illustrated in FIG. 3(*a*).

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal to the other serving radio terminals UE that are not selected, through the antenna 108A to the antenna 108D.

Furthermore, if either one of the scheduled downlink transmission data amounts to the serving radio terminal UE2-1 or the scheduled downlink transmission data amount to the serving radio terminal UE2-2 is less than the first threshold value, the SRS transmission frequency band setting unit 112 performs, on the serving radio terminal UE2-1 and the serving radio terminal UE2-2, the process of requesting transmission of SRS using any one of the frequency band 1 through the frequency band 4 illustrated in FIG. 4, at the timing of the SRS symbol 2 illustrated in FIG. 3(b). Specifically, the SRS transmission frequency band setting unit 112 sets a parameter corresponding to the bandwidth of any one of the frequency band 1 through the frequency band 4, in SoundingRS-UL-Config, that is, the information element of an RRC Connection Reconfiguration message. Furthermore, the SRS transmission frequency band setting unit 112 sets the information on a center frequency of any one of the frequency band 1 through the frequency band 4, and the information on the SRS symbol 2, in the RRC Connection Reconfiguration message. The SRS transmission frequency band setting unit 112 sets a parameter such that the serving radio terminal UE2-1 and the serving radio terminal UE2-2 transmit SRS using different frequency bands.

In addition, the SRS transmission frequency band setting unit 112 outputs to the modulation and demodulation unit 107, the RRC Connection Reconfiguration message in which the parameter as well as the information on the center frequency of any one of the frequency band 1 through the frequency band 4, and the information on the SRS symbol 2 (SRS hopping transmission request information) is set, at the timing of the subframe 311 of the downlink resource block illustrated in FIG. 3(a).

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal to the serving radio terminal UE2-1 and the serving radio terminal UE2-2, through the antenna 108A to the antenna 108D.

(Third Process)

A third process is performed after the first process and the second process.

The SRS transmission frequency band setting unit 112 determines if a priority order of assignment of a downlink resource block according to the PF scheme (hereinafter, the "PF priority order") of the serving radio terminal UE (that is, the serving radio terminal UE2-1 after the first process, and the serving radio terminal UE2-1 and serving radio terminal UE2-2 after the second process) requested for the transmission of SRS has fallen below the priority order indicated by a predetermined second threshold value.

If the PF priority order of the serving radio terminal UE requested for the transmission of the SRS has fallen below the priority order indicated by the second threshold value, the SRS transmission frequency band setting unit 112 performs the process of requesting to stop transmission of the SRS for the serving radio terminal UE whose PF priority order has fallen below the priority order indicated by the second threshold value. Specifically, the SRS transmission frequency band setting unit 112 sets the information for requesting to stop transmission of the SRS (the SRS transmission stop request information), in an RRC Connection Reconfiguration message.

In addition, the SRS transmission frequency band setting unit 112 outputs to the modulation and demodulation unit 107, the RRC Connection Reconfiguration message in which the SRS transmission stop request information is set, at the timing of the subframe 311 of the downlink resource block illustrated in FIG. 3(a).

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal to the serving radio terminal UE that is a partner requesting to stop transmission of the SRS, through the antenna 108A to the antenna 108D.

As a result of the aforementioned first process or second process, when the radio base station eNB1-1 transmits the RRC Connection Reconfiguration message, the serving radio terminal UE receives the downlink radio signal corresponding to the RRC Connection Reconfiguration message.

Moreover, the serving radio terminal UE recognizes the bandwidth of the SRS transmission frequency band based on the parameter set in the RRC Connection Reconfiguration message, and the parameter defined statically in correspondence to the cell 3-1. Furthermore, the serving radio terminal UE recognizes the center frequency of the SRS transmission frequency band based on the information on the center frequency of the SRS transmission frequency band that is set in the RRC Connection Reconfiguration message.

In addition, the serving radio terminal UE recognizes the transmission timing of the SRS based on the information on the SRS symbol 1 and the SRS symbol 2 that are set in the RRC Connection Reconfiguration message.

The serving radio terminal UE transmits the SRS using the recognized SRS transmission frequency band, at a timing of the recognized SRS symbol, in a special subframe in the frame that is two frames after the frame during the reception of the RRC Connection Reconfiguration message.

Furthermore, as a result of the aforementioned third process, when the radio base station eNB1-1 transmits the RRC Connection Reconfiguration message, the serving radio terminal UE receives the downlink radio signal corresponding to the RRC Connection Reconfiguration message.

Moreover, the serving radio terminal UE recognizes that the transmission of the SRS must be stopped, based on the SRS transmission stop request information that is set in the RRC Connection Reconfiguration message. In addition, the serving radio terminal UE stops the transmission of the SRS thereafter.

When the serving radio terminal UE transmits SRS, the radio base station eNB1-1 performs the process described below.

The radio communication unit 106 of the radio base station eNB1-1 receives the SRS, which is transmitted from the serving radio terminal UE, through the antenna 108A to the antenna 108D. In addition, the radio communication unit 106 converts the received SRS to a baseband signal, and outputs the signal to the modulation and demodulation unit 107. Furthermore, the radio communication unit 106 outputs the information on the frequency band of the received SRS to the control unit 102. The modulation and demodulation unit 107 performs demodulation and decoding processes for the input baseband signal. In this way, the data included in the SRS transmitted by the serving radio terminal UE is obtained. The data is output to the control unit 102.

The RB assignment unit 114 assigns a downlink resource block to the serving radio terminal UE. Specifically, the RB assignment unit 114 assigns to the serving radio terminal UE2-1, the downlink resource block included in the frequency band of the SRS received most recently. Next, the RB assignment unit 114 determines the time period of the assigned downlink resource block. If the reception timing of the most recent SRS is the timing of the SRS symbol 1, then the RB assignment unit 114 selects the special subframe next to the special subframe including the SRS symbol 1. Moreover, the RB assignment unit 114 determines the time period of the subframe that is one subframe before the selected special subframe as the time period of the downlink resource block to be assigned. If the reception timing of the most recent SRS is the timing of the SRS symbol 2, then the RB assignment unit 114 selects the special subframe next to the special subframe including the SRS symbol 2. Moreover, the RB assignment unit 114 determines the time period of the subframe that is two subframes before the selected special subframe as the time period of the downlink resource block to be assigned.

In addition, the RB assignment unit 114 generates a downlink RB assignment value that can uniquely identify a frequency band and a time period of the determined downlink resource block. The downlink RB assignment value is obtained by a process of a medium access control (MAC) layer. The downlink RB assignment value includes a resource block number indicating the information for uniquely identifying a time period and a frequency band of the downlink resource block to be assigned to the serving radio terminal UE.

The RB assignment unit 114 transmits the downlink RB assignment value to the serving radio terminal UE through the modulation and demodulation unit 107, the radio communication unit 106, and the antenna 108A to the antenna 108D.

Figure 6:
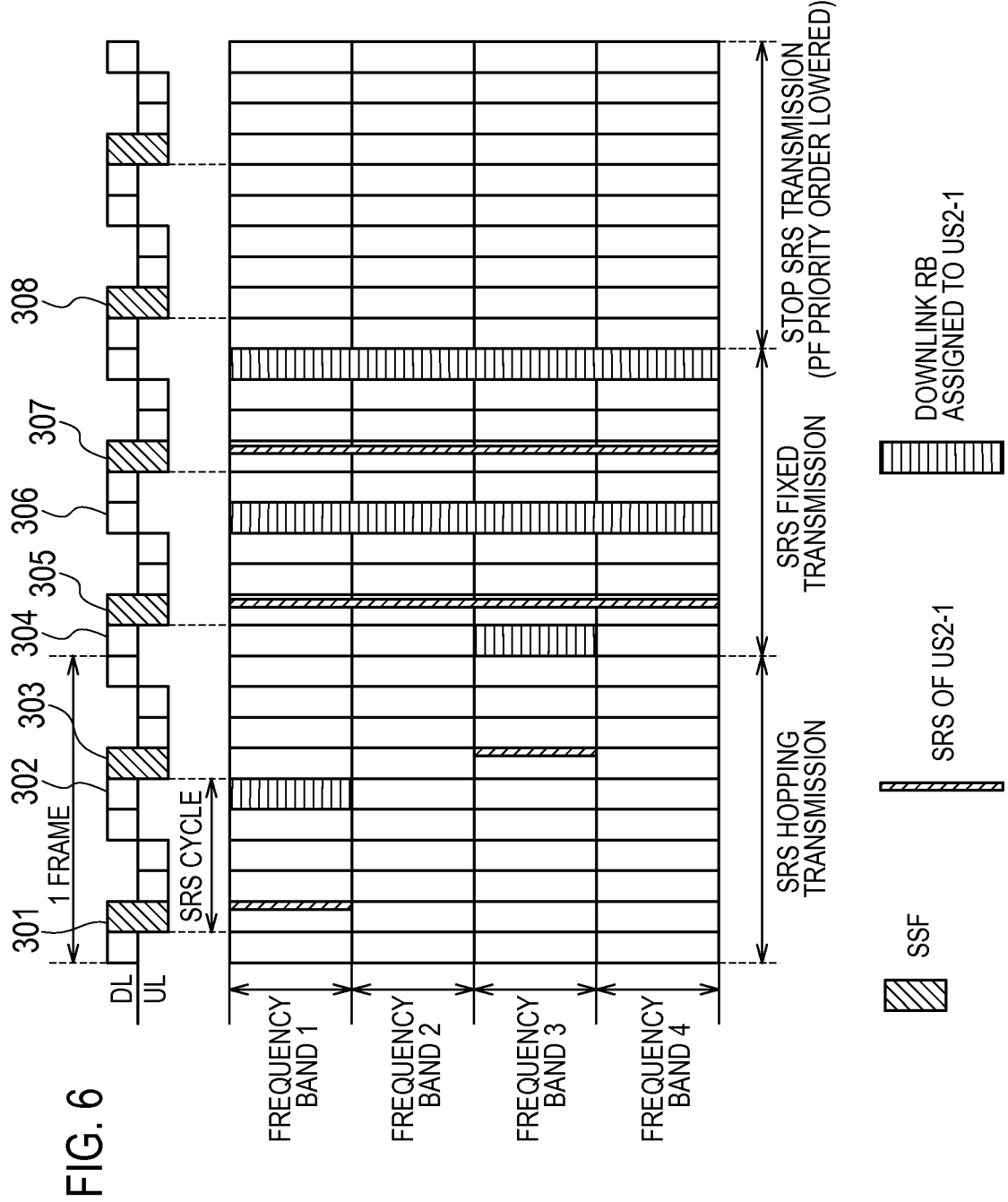
FIG. 6 is a diagram illustrating a first example of the correspondence between a frequency band of SRS and an assigned downlink RB according to the embodiment of the present invention.
Figure 7:
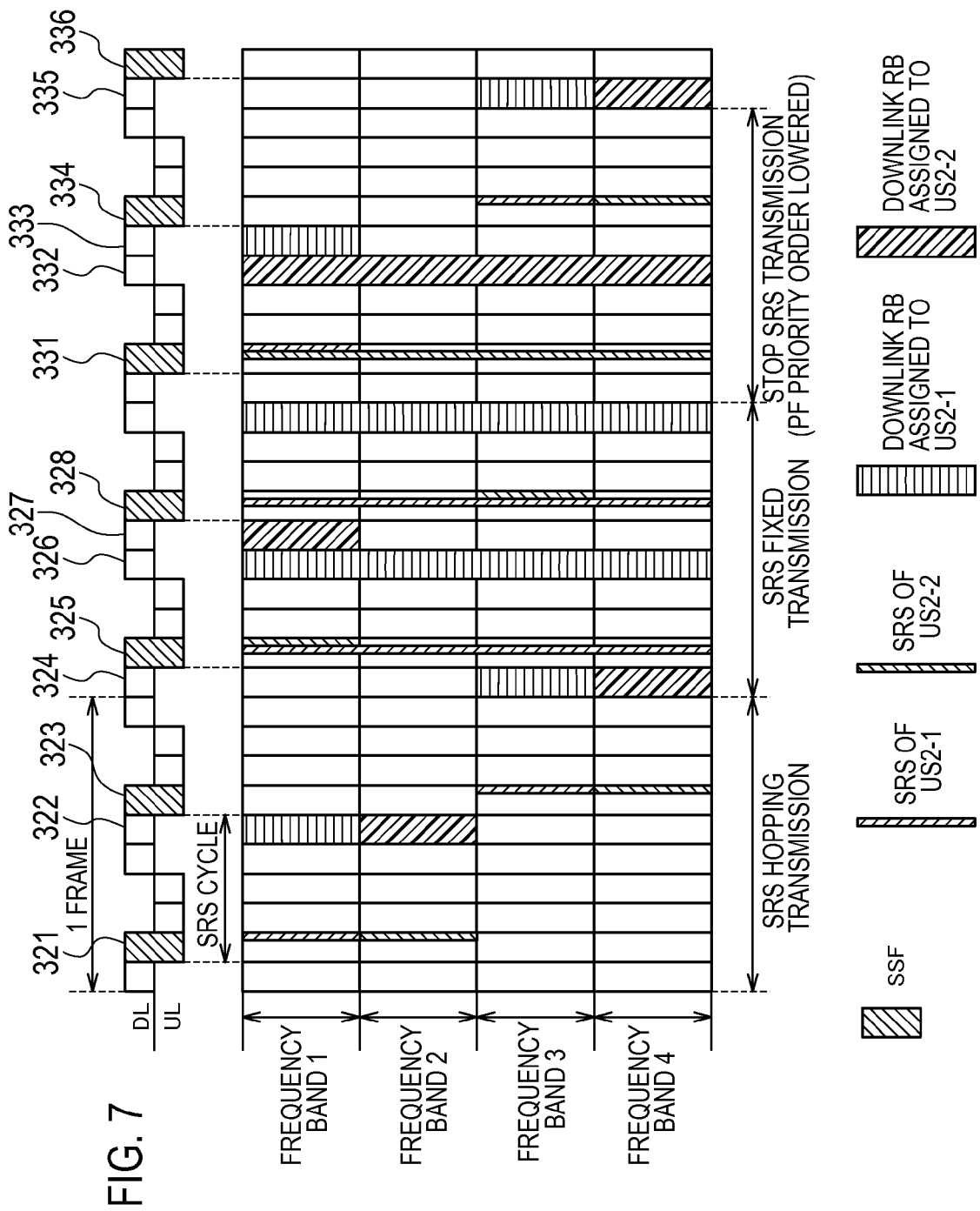
FIG. 7 is a diagram illustrating a second example of the correspondence between a frequency band of SRS and an assigned downlink RB according to the embodiment of the present invention.

FIG. 6 and FIG. 7 are diagrams illustrating an example of correspondence between a frequency band of SRS and an assigned downlink resource block.

FIG. 6 is an example of the case when the aforementioned first process and the third process are performed by the SRS transmission frequency band setting unit 112. When the RB assignment unit 114 receives the SRS of the frequency band 1 at the timing of the SRS symbol 2 of the special subframe 301, the RB assignment unit 114 assigns the downlink resource block included in the frequency band 1 at the timing of the subframe 302 that is one subframe before the next special subframe 303.

Next, when the RB assignment unit 114 receives the SRS of the frequency band 3 at the timing of the SRS symbol 2 of the special subframe 303, the RB assignment unit 114 assigns the downlink resource block included in the frequency band 3 at the timing of the subframe 304 that is one subframe before the next special subframe 305.

Moreover, when the RB assignment unit 114 receives the SRS of the entire frequency band (that is, the frequency band 1 through the frequency band 4) at the timing of the SRS symbol 1 of the special subframe 305, the RB assignment unit 114 assigns the downlink resource block included in the entire frequency band at the timing of the subframe 306 that is two subframes before the next special subframe 307.

Following this, when the PF priority order of the serving radio terminal UE2-1 falls below the priority order indicated by the second threshold value, and the serving radio terminal UE2-1 stops the transmission of the SRS, the process described below is performed. That is, when the radio base station eNB1-1 cannot receive the SRS at the timing of the special subframe 308, the RB assignment unit 114 stops the assignment of the downlink resource block at the timing of the special subframe.

FIG. 7 is an example of the case when the aforementioned second process is performed by the SRS transmission frequency band setting unit 112. When the RB assignment unit 114 receives the SRS of the frequency band 1 from the serving radio terminal UE2-1 and also receives the SRS of the frequency band 2 from the serving radio terminal UE2-2, at the timing of the SRS symbol 2 of the special subframe 321, the RB assignment unit 114 assigns the downlink resource block included in the frequency band 1 to the serving radio terminal UE2-1 and also assigns the downlink resource block included in the frequency band 2 to the serving radio terminal UE2-2, at the timing of the subframe 322 that is one subframe before the next special subframe 323.

Next, when the RB assignment unit 114 receives the SRS of the frequency band 3 from the serving radio terminal UE2-1 and also receives the SRS of the frequency band 4 from the serving radio terminal UE2-2, at the timing of the SRS symbol 2 of the special subframe 323, the RB assignment unit 114 assigns the downlink resource block included in the frequency band 3 to the serving radio terminal UE2-1 and also assigns the downlink resource block included in the frequency band 4 to the serving radio terminal UE2-2, at the timing of the subframe 324 that is one subframe before the next special subframe 325.

Following this, when the scheduled downlink transmission data amount to the serving radio terminal UE2-1 becomes equal to or more than the first threshold value, the process described below is performed. That is, when the RB assignment unit 114 receives the SRS of the entire frequency band (that is the frequency band 1 through the frequency band 4) from the serving radio terminal UE2-1, at the timing of the SRS symbol 1 of the special subframe 325, and also receives the SRS of the frequency band 1 from the serving radio terminal UE2-2, at the timing of the SRS symbol 2 of the special subframe 325, the RB assignment unit 114 assigns the downlink resource block included in the entire frequency band to the serving radio terminal UE2-1, at the timing of the subframe 326 that is two subframes before the next special subframe 328, and also assigns the downlink resource block included in the frequency band 1 to the serving radio terminal UE2-1, at the timing of the subframe 327 that is one subframe before the next special subframe 328.

Following this, when the scheduled downlink transmission data amount to the serving radio terminal UE2-1 becomes less than the first threshold value, and the scheduled downlink transmission data amount to the serving radio terminal UE2-2 becomes equal to or more than the first threshold value, the process described below is performed. That is, when the RB assignment unit 114 receives the SRS of the entire frequency band (that is the frequency band 1 through the frequency band 4) from the serving radio terminal UE2-2, at the timing of the SRS symbol 1 of the special subframe 331, and also receives the SRS of the frequency band 1 from the serving radio terminal UE2-1, at the timing of the SRS symbol 2 of the special subframe 331, the RB assignment unit 114 assigns the downlink resource block included in the entire frequency band to the serving radio terminal UE2-2, at the timing of the subframe 332 that is two subframes before the next special subframe 334, and also assigns the downlink resource block included in the frequency band 1 to the serving radio terminal UE2-2, at the timing of the subframe 333 that is one subframe before the next special subframe 334.

Following this, when both the scheduled downlink transmission data amount to the serving radio terminal UE2-1 and the scheduled downlink transmission data amount to the serving radio terminal UE2-2 become less than the first threshold value, the process described below is performed. That is, when the RB assignment unit 114 receives the SRS of the frequency band 3 from the serving radio terminal UE2-1 and also receives the SRS of the frequency band 4 from the serving radio terminal UE2-2, at the timing of the SRS symbol 2 of the special subframe 334, the RB assignment unit 114 assigns the downlink resource block included in the frequency band 3 to the serving radio terminal UE2-1 and also assigns the downlink resource block included in the frequency band 4 to the serving radio terminal UE2-2, at the timing of the subframe 335 that is one subframe before the next special subframe 336.

After the downlink resource blocks have been assigned by the RB assignment unit 114, the antenna weight calculation unit 116 calculates the antenna weight (a transmission weight) during the transmission of the downlink radio signal using the assigned downlink resource block, for each antenna 108A to the antenna 108D.

Specifically, the antenna weight calculation unit 116 identifies the frequency band of a downlink resource block assigned to each of the serving radio terminal UE2-1 and the serving radio terminal UE2-2, based on the downlink RB assignment value generated by the RB assignment unit 114.

Next, the antenna weight calculation unit 116 calculates the transmission weight for each frequency band of the downlink resource block assigned to each of the serving radio terminal UE2-1 and the serving radio terminal UE2-2, based on the SRS received most recently. The antenna weight calculation unit 116 calculates, for each SRS from each of the serving radio terminal UE2-1 and the serving radio terminal UE2-2, an antenna weight (a reception weight), at which a signal-to-interference noise ratio (SINR) at the time of reception of the SRS is maximum.

Moreover, the antenna weight calculation unit 116 sets the reception weight corresponding to the SRS from the serving radio terminal UE2-1 as the transmission weight of the frequency band of the downlink resource block assigned to the serving radio terminal UE2-1, and also sets the reception weight corresponding to the SRS from the serving radio terminal UE2-2 as the transmission weight of the frequency band of the downlink resource block assigned to the serving radio terminal UE2-2.

The calculated reception weight of each of the antenna 108A to the antenna 108D is the antenna weight at which the SINR is the maximum at the time of reception of the uplink radio signal from the serving radio terminal UE2-1 and the serving radio terminal UE2-2. Therefore, when the reception weights are set as the transmission weights, the transmission weights are the antenna weights at which a desired wave direction of a beam during the transmission of a downlink radio signal to the serving radio terminal UE2-1 is directed to the serving radio terminal UE2-1, and the antenna weights at which a desired wave direction of a beam during the transmission of a downlink radio signal to the serving radio terminal UE2-2 is directed to the serving radio terminal UE2-2.

Following this, the control unit 102 transmits the downlink radio signal to the serving radio terminal UE2-1 and the serving radio terminal UE2-2, through the modulation and demodulation unit 107, the radio communication unit 106, and the antenna 108A to the antenna 108D, by using the assigned downlink resource block.

(3) Operation of Radio Base Station

Figure 8:
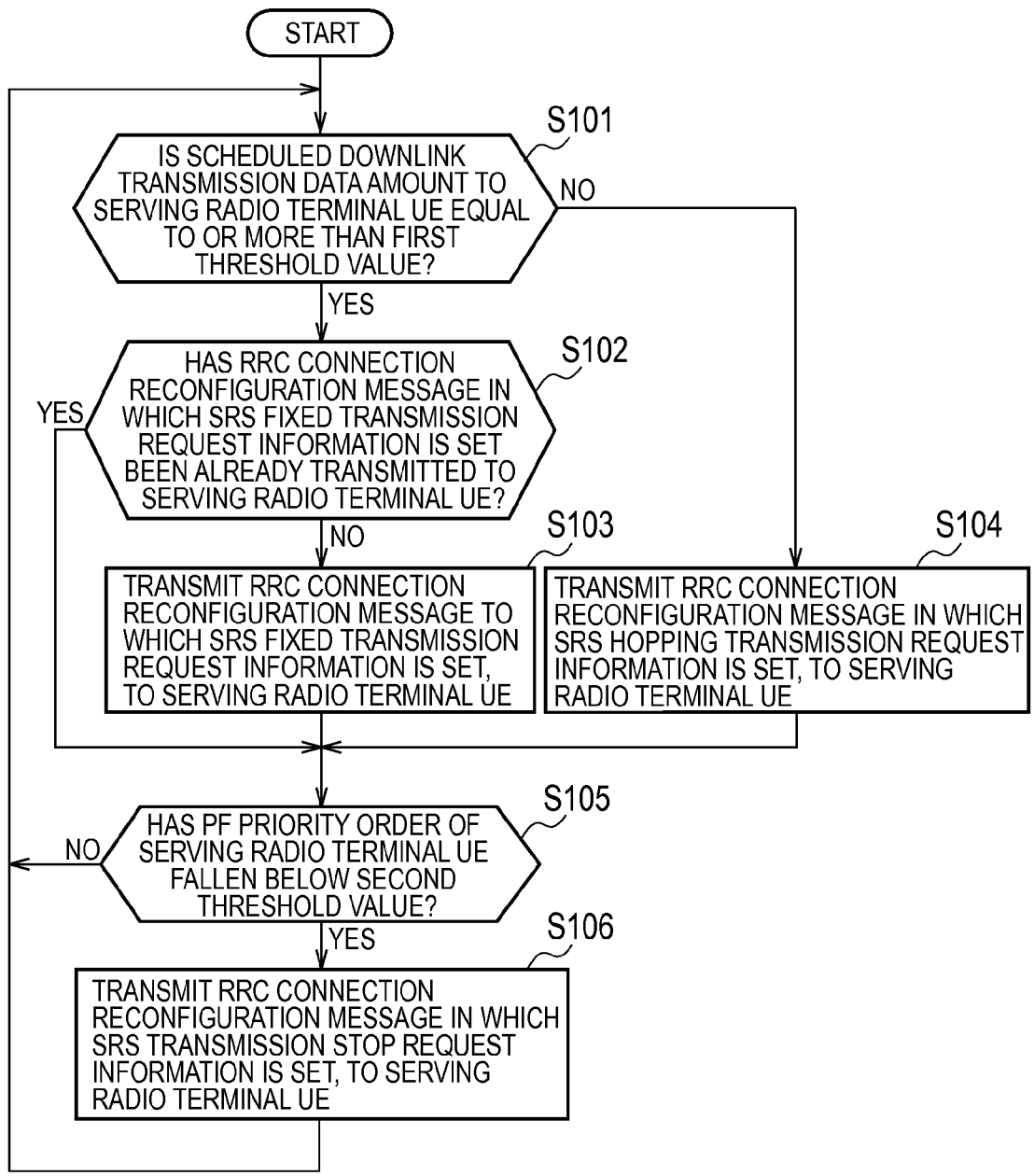
FIG. 8 is a flowchart illustrating a first operation of the radio base station according to the embodiment of the present invention.

FIG. 8 and FIG. 9 are flowcharts illustrating an operation of the radio base station eNB1-1.

The operation illustrated in FIG. 8 is the operation for the case when the aforementioned first process and the third process are performed. In step S101, the radio base station eNB1-1 determines if the scheduled downlink transmission data amount to the serving radio terminal UE2-1 is equal to or more than the first threshold value.

If the scheduled downlink transmission data amount is equal to or more than the first threshold value, then in step S102, the radio base station eNB1-1 determines if an RRC Connection Reconfiguration message, in which the SRS fixed transmission request information is set, is already transmitted to the serving radio terminal UE2-1.

If the RRC Connection Reconfiguration message, in which the SRS fixed transmission request information is set, is not transmitted, then in step S103, the radio base station eNB1-1 transmits an RRC Connection Reconfiguration message, in which the SRS fixed transmission request information is set, to the serving radio terminal UE2-1.

On the other hand, if the scheduled downlink transmission data amount is less than the first threshold value, then in step S104, the radio base station eNB1-1 transmits an RRC Connection Reconfiguration message, in which the SRS hopping transmission request information is set, to the serving radio terminal UE2-1.

After an affirmative judgment is made in step S102, or after the step S103, or else after the step S104, the radio base station eNB1-1 determines, in step S105, if the PF priority order corresponding to the serving radio terminal UE2-1 has fallen below the priority order indicated by the second threshold value.

If the PF priority order corresponding to the serving radio terminal UE2-1 has fallen below the priority order indicated by the second threshold value, then in step S106, the radio base station eNB1-1 transmits an RRC Connection Reconfiguration message, in which the SRS transmission stop request information is set, to the serving radio terminal UE2-1.

On the other hand, if the PF priority order corresponding to the serving radio terminal UE2-1 has not fallen below the priority order indicated by the second threshold value, the operation of step S101 and thereafter is repeated. Furthermore, the operation of step S101 and thereafter is repeated even after the step S105.

The operation illustrated in FIG. 9 is the operation for the case when the aforementioned second process and the third process are performed. In step S201, the radio base station eNB1-1 determines if either one of the scheduled downlink transmission data amount to the serving radio terminal UE2-1 or the serving radio terminal UE2-2 is equal to or more than the first threshold value.

If either one of the scheduled downlink transmission data amounts to the serving radio terminal UE2-1 or the serving radio terminal UE2-2 is equal to or more than the first threshold value, then in step S202, the radio base station eNB1-1 selects the serving radio terminal UE with the maximum scheduled downlink transmission data amount.

In step S203, the radio base station eNB1-1 determines if an RRC Connection Reconfiguration message, in which the SRS fixed transmission request information is set, is already transmitted to the selected serving radio terminal UE.

If the RRC Connection Reconfiguration message, in which the SRS fixed transmission request information is set, is not transmitted, then in step S204, the radio base station eNB1-1 transmits an RRC Connection Reconfiguration message, in which the SRS fixed transmission request information is set, to the selected serving radio terminal UE.

After an affirmative judgment is made in step S203, or after the step S204, the radio base station eNB1-1 transmits an RRC Connection Reconfiguration message, in which the SRS hopping transmission request information is set, to the other serving radio terminal UE that is not selected, in step S205.

On the other hand, if either one of the scheduled downlink transmission data amount to the serving radio terminal UE2-1 or to the serving radio terminal UE2-2 is less than the first threshold value, then in step S206, the radio base station eNB1-1 transmits an RRC Connection Reconfiguration message, in which the SRS hopping transmission request information is set, to the serving radio terminal UE2-1 and the serving radio terminal UE2-2.

After the step S205 or the step S206, the radio base station eNB1-1 determines, in step S207, if the PF priority order corresponding to either one of the serving radio terminal UE2-1 or the serving radio terminal UE2-2 has fallen below the priority order indicated by the second threshold value.

If the PF priority order corresponding to either one of the serving radio terminal UE2-1 or the serving radio terminal UE2-2 has fallen below the priority order indicated by the second threshold value, then in step S208, the radio base station eNB1-1 transmits an RRC Connection Reconfiguration message, in which the SRS transmission stop request information is set, to the serving radio terminal UE corresponding to the PF priority order that has fallen below the priority order indicated by the second threshold value.

On the other hand, unless the PF priority order corresponding to either one of the serving radio terminal UE2-1 or the serving radio terminal UE2-2 is below the priority order indicated by the second threshold value, the operation of step S201 and thereafter is repeated. Furthermore, the operation of step S201 and thereafter is repeated even after the step S201.

(4) Operation and Effect

As described above, according to the present embodiment, the radio base station eNB1-1 selectively uses, depending on the scheduled downlink data amount to the serving radio terminal UE, between the transmission of the RRC Connection Reconfiguration message, in which the SRS fixed transmission request information requesting transmission of SRS in the entire fixed frequency band is set, and the transmission of the RRC Connection Reconfiguration message, in which the SRS hopping transmission request information requesting transmission of the SRS in any of the frequency band 1 through the frequency band 4 is set. In this case, if the RRC Connection Reconfiguration message, in which the SRS fixed transmission request information requesting transmission of SRS in the entire fixed frequency band is set, is already transmitted, the radio base station eNB1-1 does not again transmit the RRC Connection Reconfiguration message, in which the SRS fixed transmission request information is set. Therefore, the SRS transmission requests to the serving radio terminal UE are reduced in number, and a downlink resource block can be used efficiently.

Furthermore, in the present embodiment, the transmission time period of SRS and the timing of a downlink resource block assigned based on the SRS are correlated. Specifically, an SRS symbol 1, and the downlink resource block corresponding to the subframe that is two subframes before the special subframe next to the special subframe including the SRS symbol 1 are correlated, and at the same time, an SRS symbol 2, and the downlink resource block corresponding to the subframe that is one subframe before the special subframe next to the special subframe including the SRS symbol 2 are correlated. Therefore, the radio base station eNB1-1 can easily assign, to the serving radio terminal UE2-1 and the serving radio terminal UE2-2, downlink resource blocks having overlapping frequency bands but different timing.

(5) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiment, the timing of the special subframe was used as the transmission timing of SRS in the serving radio terminal UE2-1. However, the transmission timing of the SRS is not limited thereto, and it is sufficient if the transmission timing is a timing agreed in advance between the radio base station eNB1-1 and the serving radio terminal UE2. However, it is preferable that the transmission timing of the SRS exists once in a time of at least one frame.

Furthermore, in the aforementioned embodiment, the radio base station eNB1-1 used the reception weight as the transmission weight. However, the transmission weight may be calculated independently of the reception weight.

In the aforementioned embodiment, the TDD-LTE radio communication system was described. However, the present invention can be applied in the same manner to all types of radio communication systems in which asymmetric radio communication in which a frequency band of an uplink radio signal to be assigned to a radio terminal is different from a frequency band of a downlink radio signal is employed.

In the aforementioned embodiment, the SRS fixed transmission request information included the information on the SRS symbol 1, however the present invention is not limited thereto. The SRS fixed transmission request information need not necessarily include the information on the SRS symbol 1. For example, the SRS fixed transmission request information may include only a parameter and information on a center frequency of the entire fixed frequency band.

In the aforementioned embodiment, the SRS hopping transmission request information included the information on the SRS symbol 2, however the present invention is not limited thereto. The SRS hopping transmission request information need not necessarily include the information on the SRS symbol 2. For example, the SRS hopping transmission request information may include only a parameter and information on a center frequency of any of the frequency band 1 through the frequency band 4.

Thus, it must be understood that the present invention includes various embodiments that are not described herein. Therefore, the present invention is limited only by the specific features of the invention in the scope of the claims reasonably evident from the disclosure above.

The entire contents of Japanese Patent Application No. 2010-191351 (filed on Aug. 27, 2010) and Japanese Patent Application No. 2010-191352 (filed on Aug. 27, 2010) are incorporated in the present specification by reference.

INDUSTRIAL APPLICABILITY

According to the present invention, it is possible to improve the utilization efficiency of a radio resource.

The invention claimed is:

1. A radio base station of an adaptive array scheme for applying an antenna weight, comprising:
    a plurality of antennas; and
    a transmission unit that includes an output communicatively coupled to the plurality of antennas and that transmits, to a serving radio terminal, information on a reference signal transmission frequency band available in a transmission of an uplink reference signal received from the serving radio terminal, the reference signal used by the radio base station to calculate the antenna weight for downlink transmission by the radio base station for the plurality of antennas, wherein
    the information transmitted by the transmission unit includes at least either one of information on a first reference signal transmission frequency band indicating a fixed frequency band, or information on a second reference signal transmission frequency band indicating a frequency band that switches in a predetermined cycle, the first reference signal transmission frequency band being wider than the second reference signal transmission frequency band,
    the transmission unit transmits the information on the first reference signal transmission frequency band, when the downlink data amount that must be transmitted to the serving radio terminal is equal to or more than a first threshold value, and
    the transmission unit transmits the information on the second reference signal transmission frequency band, when the downlink data amount that must be transmitted to the serving radio terminal is less than the first threshold value.

2. The radio base station according to claim 1, wherein the transmission unit transmits transmission stop request information requesting to stop transmission of the reference signal, to the serving radio terminal, when a communication quality in the serving radio terminal is below a second threshold value.

3. A communication control method in a radio base station of adaptive array scheme applying an antenna weight to a plurality of antennas, comprising:
    a step of transmitting, to a serving radio terminal, information on a reference signal transmission frequency band available in a transmission of an uplink reference signal received from the serving radio terminal, the reference signal used by the radio base station to calculate the antenna weight for downlink transmission by the radio base station, wherein
    the step of transmitting includes a step of transmitting at least either one of information on a first reference signal transmission frequency band indicating fixed frequency band, or information on a second reference signal transmission frequency band indicating a frequency band that switches in a predetermined cycle, the first reference signal transmission frequency band being wider than the second reference signal transmission frequency band,
    the step of transmitting includes transmitting the information on the first reference signal transmission frequency band, when the downlink data amount that must be transmitted to the serving radio terminal is equal to or more than a first threshold value, and
    the step of transmitting includes transmitting the information on the second reference signal transmission frequency band, when the downlink data amount that must be transmitted to the serving radio terminal is less than the first threshold value.

4. A radio base station of an adaptive array scheme for applying an antenna weight, comprising:
    a plurality of antennas; and
    a transmission unit that includes an output communicatively coupled to the plurality of antennas and that transmits, to a serving radio terminal, information on a reference signal transmission frequency band available in a transmission of an uplink reference signal received from the serving radio terminal, the reference signal used by the radio base station to calculate the antenna weight for downlink transmission by the radio base station for the plurality of antennas, wherein
    the transmission unit transmits at least any one of information on a first reference signal transmission frequency band indicating a fixed frequency band and a first symbol position indicating a transmission timing when the reference signal is transmitted using the first reference signal transmission frequency band, or information on a second reference signal transmission frequency band indicating a frequency band that switches in a predetermined cycle and a second symbol position indicating a transmission timing when the reference signal is transmitted using the second reference signal transmission frequency band, and
    the first symbol position is correlated with the timing of a first radio resource, and the second symbol position is correlated with the timing of a second radio resource.

5. The radio base station according to claim 4, wherein
    the first reference signal transmission frequency band is wider than the second reference signal transmission frequency band, and
    the transmission unit transmits the information on the first reference signal transmission frequency band and the information on the first symbol position, when the downlink data amount that must be transmitted to the serving radio terminal is equal to or more than a first threshold value, and the transmission unit transmits the information on the second reference signal transmission frequency band and the information on the second symbol position, when the downlink data amount that must be transmitted to the serving radio terminal is less than the first threshold value.

6. The radio base station according to claim 4, wherein the transmission unit transmits transmission stop request information requesting to stop transmission of the reference signal, to the serving radio terminal, when a communication quality in the serving radio terminal is below a second threshold value.

7. A communication control method in a radio base station of an adaptive array scheme applying an antenna weight to a plurality of antennas, comprising:
    a step of transmitting, to a serving radio terminal, information on a reference signal transmission frequency band available in a transmission of an uplink reference signal received from the serving radio terminal, the reference signal used by the radio base station to calculate the antenna weight for downlink transmission by the radio base station, wherein
    the step of transmitting includes a step of transmitting at least any one of information on a first reference signal transmission frequency band indicating a fixed frequency band and a first symbol position indicating a transmission timing when the reference signal is transmitted using the first reference signal transmission frequency band, or information on a second reference signal transmission frequency band indicating a frequency band that switches in a predetermined cycle and a second symbol position indicating a transmission timing when the reference signal is transmitted using the second reference signal transmission frequency band, and the first symbol position is correlated with the timing of a first radio resource, and the second symbol position is correlated with the timing of a second radio resource.

* * * * *